United States Patent Office 3,194,262
Patented July 13, 1965

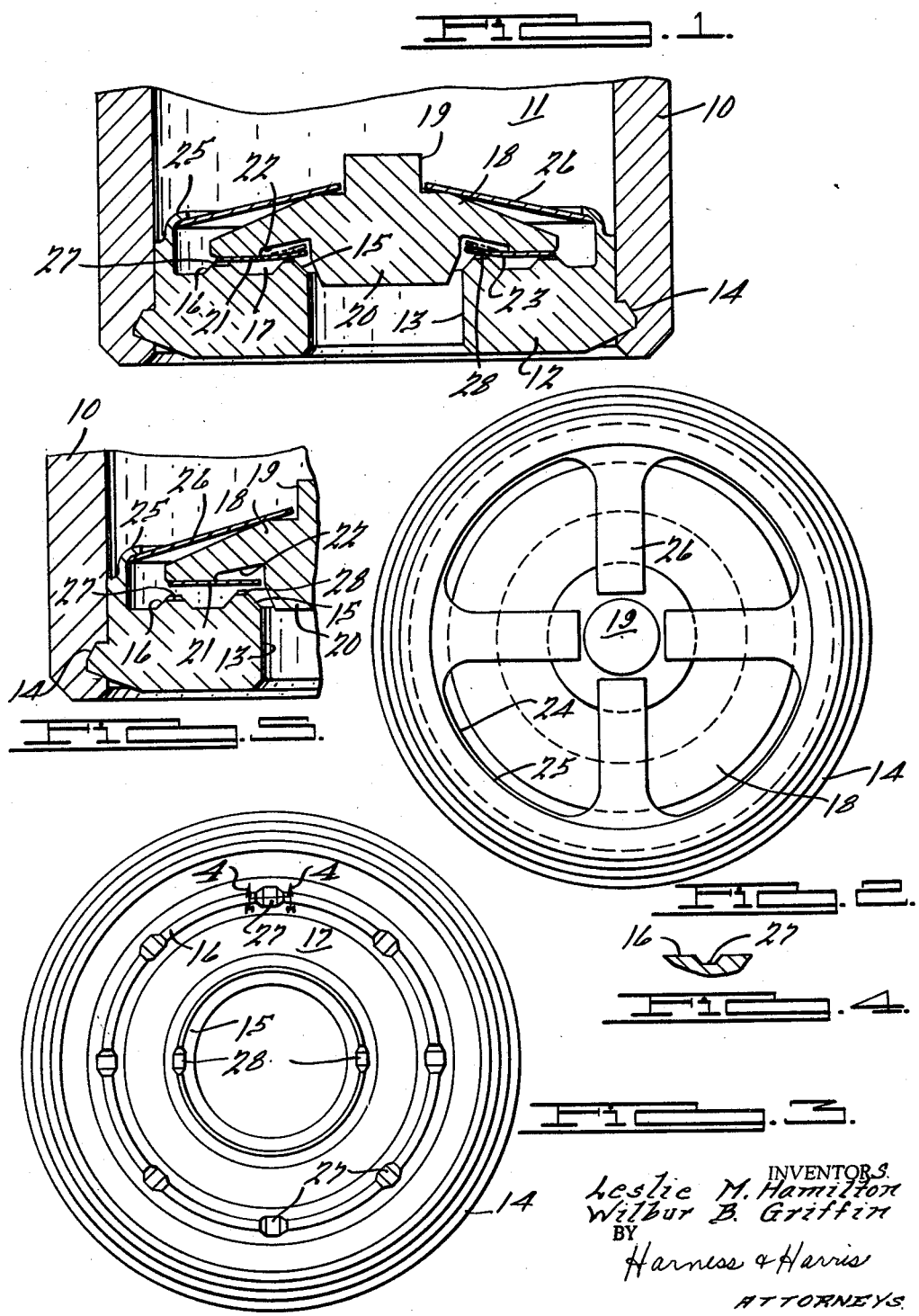

3,194,262
SHOCK ABSORBER BASE VALVE
Leslie M. Hamilton, Muncie, and Wilbur B. Griffin, New Castle, Ind., assignors to Chrysler Corporation, Highland Park, Mich., a corporation of Delaware
Filed Dec. 10, 1963, Ser. No. 329,417
7 Claims. (Cl. 137—493)

This invention relates to improvements in the base valve for a vehicle type shock absorber, and has for a principle object the provision of such a valve having "pop-off" characteristics in combination with orifice type valving and which has fewer parts and is more economical to manufacture than comparable valves.

Another and more specific object is to provide such a valve separating a compression chamber and a reservoir comprising a base valve body having a central port therethrough for connecting the compression chamber and reservoir and having concentric inner and outer raised valve seats around the central port and spaced by an annular pressure chamber. The latter is recessed into the surface of the valve body confronting the compression chamber side thereof, the inner and outer seats being raised from that surface in the direction toward the compression chamber side. A valve plate overlies said surface and is provided with oppositely directed central pilots, the lower of which extends into the valve body port. An annular leaf spring piloted on the latter pilot extends around the port at a location between the valve plate and body and is adapted to seat at both seats simultaneously to block unrestricted communication between the compression chamber and port. A lightweight finger spring, having an outer rim retained in position by the side wall of the compression chamber, has a plurality of radially inwardly directed fingers engaging the upper of said pilots to maintain the valve plate centrally located with respect to the valve body and seated lightly on both seats.

An annular outer portion of the valve plate is arranged to rest on an annular portion of the leaf spring overlying the outer valve seat. The pressure within the compression chamber during a compression of the shock absorber urges the valve plate toward the valve body to clamp the aforesaid outer portion of the leaf spring in seated position at the outer seat, whereby the leaf spring will seat at both seats. At a predetermined low pressure in the compression chamber, the pressure differential between the latter and reservoir or port raises the valve plate from the valve body against the force of the lightweight finger spring to enable the leaf spring to float off both seats and establish unrestricted communication between the reservoir and compression chamber.

Restrictive and comparatively nonrestrictive orifices are provided such that when the leaf spring is seated at both seats, the restrictive orifice provides restricted communication between the compression chamber and port, whereas the nonrestrictive orifice provides comparatively unrestricted communication between the compression chamber and pressure chamber. The inner portion of the leaf spring overlying the pressure chamber is yieldable in response to a predetermined pressure therein so as to uncover the latter and progressively increase the communication between the pressure chamber and port, and hence between the compression chamber and port, as the pressure in the compression chamber increases.

By virtue of the foregoing, a minimum of positive attachments and assembly operations between the several valve components is achieved with resulting economies. Also by reason of the annular leaf spring overlying both valve seats, the restrictive and nonrestrictive orifices are readily and economically coined in the inner and outer valve seats respectively. The restrictive orifices thus cooperate with the leaf spring to complete a restricted passage connecting the pressure chamber and port, whereas the nonrestrictive orifices cooperate with the leaf spring to complete a comparatively nonrestrictive passage connecting the compression chamber and pressure chamber.

Still another object is to provide such a valve wherein the inner seat is raised toward the overlying leaf spring to a greater distance than the outer seat, so that the leaf spring in is seated position will be pretensed slightly out of a single plane surface.

Accordingly the tendency of the leaf spring to be retained on the inner and outer seats by capillary attraction is minimized and the responsiveness of the valve to the resilient and pressure forces involved is materially enhanced.

Other objects of this invention will appear in the following description and appended claims, reference being had to the accompanying drawings forming a part of this specification wherein like reference characters designate corresponding parts in the several views.

FIGURE 1 is a fragmentary mid-sectional view through a base valve embodying the present invention.

FIGURE 2 is a plan view of the valve assembly removed from the cylinder.

FIGURE 3 is a plan view of the valve body, with the valve plate removed.

FIGURE 4 is a fragmentary sectional view taken in the direction of the arrows substantially along line 4—4 of FIGURE 3.

FIGURE 5 is a fragmentary sectional view similar to FIGURE 1, illustrating the valve plate in the rebound position.

It is to be understood that the invention is not limited in its appilication to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings a particular embodiment of the present invention is illustrated by way of example in an automobile shock absorber comprising a cylindrical housing 10 enclosing a compression chamber 11 within which a vertically reciprocal piston (not shown) rides. The compression chamber 11 is filled with hydraulic fluid and is partitioned from a reservoir by means of an annular base valve body 12 having a central port 13 in communication with the reservoir. An annular rim 14 of the body 12 is interfitted at a leak proof seal within a mating channel at the base of the inner side wall of cylinder 10. Referring to FIGURES 1 and 3, inner and outer annular valve seats 15 and 16, respectively, are raised from the upper surface of the body 12 which confronts the compression chamber 11 and are spaced by an annular pressure chamber 17. Overlying the body 12 is a valve plate 18 having upper and lower concentric pilots 19 and 20 and a concentric annular plane surface overlying the outer seat 16 and a portion of pressure chamber 17. An annular recess 22 between the surface 21 and pilot 20 provides clearance for the inner portion of an axially floating annular leaf spring 23 adapted to overlie and seat at the seats 15 and 16 and having its outer portion directly underlying the surface 21. The annular seat 15 is raised slightly with respect to annular seat 16 so that in the normally seated position of leaf spring 23, the inner portion of the latter will be pretensed out of the plane of surface 21, as illustrated in FIGURE 1. The inner portion of leaf spring 23 also closely fits around pilot 20 so as to be maintained in predetermined coaxial alignment with respect to the valve plate 18.

Overlying the valve plate 18 is an annular finger spring having an outer rim 24 closely confined beneath an annular flange 25 of the body 12 and having four radially inwardly directed fingers 26 terminating adjacent pilot 19 to maintain the valve plate 18 in predetermined coaxial alignment with respect to seats 15 and 16.

As illustrated in FIGURE 1, the seats 15 and 16 are truncated triangles in cross sectional shape. Suitably formed in seats 16 and 15 respectively are a plurality of nonrestrictive notches 27 and restrictive orifices 28. In accordance with the construction shown, the orifices 27 and 28 are readily formed by a coining operation and the base valve components are maintained in assembled position simply by folding or crimping annular flange 25 over the rim 24 of the finger spring.

In operation of the structure described, during a compression stroke of the piston which rides in chamber 11, the pressure in chamber 11 rises to urge plate 18 downwardly to hold spring 23 seated at both seats 15 and 16. The pressurized hydraulic fluid thus flows comparatively freely through the orifices 27 into the pressure chamber 17, thence through the restricted orifices 28 into the reservoir via port 13. During the initial phase of the compression stroke, spring 23 will rest on the surface of seat 15. As the pressure in compression chamber 11 increases, the pressure in chamber 17 will increase correspondingly because the orifices 27 provide comparative unrestricted communication between the compression chamber 11 and pressure chamber 17 in comparison with the restricted passage offered by orifices 28. At a predetermined pressure in compression chamber 11, the pressure in chamber 17 will force the inner portion of leaf spring 23 upwardly as illustrated by the dotted view, FIGURE 1, to increase the communication between chamber 11 and port 13. Where desired, the nonrestrictive orifices 27 could become increasingly restrictive as leaf spring 23 opens and the fluid flow through the orifices 27 and 28 in series increases.

During the rebound operation of the shock absorber, the pressure in chamber 11 becomes subatmospheric, so that the pressure in the reservoir communicating with port 13 readily lifts the valve plate 18 to the position illustrated in FIGURE 5 to cause a reverse flow of fluid through port 13 to chamber 11. During this operation the fluid flowing upward through port 13 will normally carry the freely floating leaf spring 23 upwardly and maintain the latter in contact with surface 21. However, it is to be understood that the leaf spring 23 is free of postive attachment with any part of the valve mechanism.

We claim:

1. In a shock absorber having a compression chamber and a reservoir, base valve means partitioning said compression chamber from said reservoir, said base valve means including a body having a port therethrough leading to said reservoir, the surface of said body on the compression chamber side thereof having an inner valve seat adjacent said port and an outer valve seat remote from said port, inner and outer orifices recessed into said inner and outer seats respectively, a pressure chamber recessed into said surface between said seats, said base valve means including shiftable valve plate means adapted to seat at said inner and outer seats and cover said inner and outer orifices and pressure chamber, said outer valve seat and plate means seated thereat cooperating to separate said compression chamber from said pressure chamber, said inner valve seat and plate means seated thereat cooperating to separate said pressure chamber from said port, said compression chamber and port being in unrestricted communication when said plate means is unseated from said seats, said valve plate means being responsive to the pressure differential between said compression chamber and port to be unseated from said valve seats when the pressure in said compression chamber falls to a predetermined value below the pressure in said port, and to be urged toward said seats to seat thereat by a force proportional to said pressure differential when the pressure in said compression chamber rises to a predetermined value above the pressure in said port, the inner orifice in said inner valve seat being of restricted cross sectional area and connecting said pressure chamber and port, the outer orifice in said outer valve seat connecting said compression chamber and pressure chamber and being comparatively nonrestrictive to fluid flow with respect to said restricted passage so as to communicate the pressure of said compression chamber to said pressure chamber, the portion of said valve plate means covering said inner orifice comprising a flat leaf spring cooperating with said inner orifice to provide a restricted passage for fluid from said pressure chamber to said port, said leaf spring being yieldable from said inner valve seat in response to a predetermined pressure in said pressure chamber to open the communication between said pressure chamber and port.

2. In a shock absorber having a compression chamber and a reservoir, means partitioning said compression chamber from said reservoir including a base valve member having a port therethrough for connecting said compression chamber and reservoir and also including a plate member overlying said base valve member to cover said port, a flat leaf spring piloted on said plate member and freely floating between the latter and said base valve member, one of said members having a pressure chamber recessed into a surface thereof confronting the other member at a location opening into said port, a valve seat on a portion of said base valve member confronting said plate member at a location between said compression chamber and port, said leaf spring being interposed between said plate member and valve seat to cover said pressure chamber and being normally seated at said valve seat to restrict the communication between said compression chamber and port, an unrestricted duct connecting said compression chamber and pressure chamber, said leaf spring being yieldable from said one member in response to a predetermined high pressure in said pressure chamber to uncover the latter and progressively increase the communication between the compression chamber and port, said plate member being responsive to the pressure differential between said compression chamber and port to be urged towards said base valve member to urge said leaf spring to its seated position at said valve seat when the pressure in said compression chamber exceeds the pressure in said port by a predetermined value, said plate member being shiftable from said base valve when the pressure in said compression chamber falls a predetermined amount below the pressure in said port to enable said freely floating leaf spring to shift from said seated position to connect said compression chamber and port, and a restricted orifice recessed into said valve seat providing restricted communication between said compression chamber and port when said leaf spring is seated at said valve seat, said restricted orifice being uncovered to decrease the restriction in the communication between said compression chamber and port upon yielding of said leaf spring from said one member in response to said predetermined high pressure.

3. In a shock absorber having a compression chamber and a reservoir, base valve means partitioning said compression chamber and reservoir comprising a body having a port therethrough for interconnecting said compression chamber and reservoir, the surface of said body on the compression chamber side thereof having inner and outer valve seats extending entirely around said port, a pressure chamber recessed into said surface between said seats, a restricted inner orifice and a comparatively unrestricted outer orifice recessed into said inner and outer seats respectively, a leaf spring extending entirely around said port and overlying said surface and said inner and outer seats and intermediate pressure chamber and being adapted to seat at said seats to cover said orifices, said leaf spring closing said valve means when seated at said seats and being freely floating to unseat from said seats to open said valve means, said surface being in unrestricted communication with said compression chamber when said valve means is open, said outer orifice when covered by said leaf spring seated at said outer seat cooperating with said leaf spring to complete a comparatively unrestricted passage connecting said compression chamber and pressure chamber, said inner orifice when covered by said leaf spring seated at said inner seat cooperating with said leaf spring to complete a restricted passage connecting said pressure chamber and port, the inner portion of said leaf spring overlying said inner seat and pressure chamber being responsive to a predetermined pressure in said pressure chamber to yield and uncover said restricted orifice to increase the communication between said pressure chamber and port, a valve plate overlying said leaf spring and port and being responsive to the pressure differential between said compression chamber and port to be urged thereby in one direction toward said leaf spring when the pressure in said compression chamber exceeds the pressure in said port by a predetermined amount, and to be urged thereby in the opposite direction when the pressure in said port exceeds the pressure in said compression chamber by a predetermined amount, said plate having an outer portion adapted to engage and urge said outer portion of said leaf spring toward said outer seat to seat thereat when said plate is urged by said pressure differential in said one direction toward said leaf spring, and to release said freely floating leaf spring to unseat from said seat when said plate is urged by said pressure differential in said opposite direction.

4. In the combination according to claim 3, said leaf spring comprising a flat annular disc, said inner seat extending toward said leaf spring beyond said outer seat to subject the inner portion of said leaf spring to tension when said leaf spring is seated at both of said seats.

5. In the combination according to claim 3, said valve plate having a central portion extending into said port and exposed to the pressure therein, and said leaf spring having a central opening registering with said port, the edge of said central opening being closely piloted on said central portion of said valve plate for guided movement toward and from said seats.

6. In a shock absorber having a compression chamber and a reservoir, base valve means partitioning said compression chamber from said reservoir, said base valve means including a body having a port therethrough leading to said reservoir, the surface of said body on the compression chamber side thereof having an inner valve seat adjacent said port and an outer valve seat remote from said port, a pressure chamber recessed into said surface between said seats, a freely floating leaf spring valve seated on said inner and outer seats and covering said pressure chamber, said leaf spring being adapted to float off said seats, a valve plate overlying said base valve means to cover said port and having an outer portion overlying said outer valve seat, said valve plate being responsive to the pressure differential between said compression chamber and port to be urged toward or from said base valve respectively when the pressure in said compression chamber rises to a predetermined value above or falls to a predetermined value below the pressure in said port, thereby respectively to clamp said leaf spring against said outer seat or to release said leaf spring from said seats, said port and compression chamber being in unrestricted communication when said leaf spring is released from said seats, said leaf spring being also yieldable from said inner valve seat in response to a predetermined pressure in said pressure chamber to open the communication between said pressure chamber and port, restrictive and comparatively non-restrictive means cooperating to provide comparatively nonrestricted communication between said compression chamber and pressure chamber and for providing restricted communication between said compression chamber and port.

7. In the combination according to claim 6, the last named means therein comprising a nonrestricted orifice recessed into said outer seat and a restrictive orifice recessed into said inner seat.

References Cited by the Examiner

UNITED STATES PATENTS 2,296,732  9/42  Oyston et al. _____ 137—493.1

FOREIGN PATENTS 739,459  10/55  Great Britain.

M. CARY NELSON, *Primary Examiner.*

MARTIN P. SCHWADRON, *Examiner.*